United States Patent [19]

Sundberg

[11] 4,351,889
[45] Sep. 28, 1982

[54] TUBULAR BODIES FOR USE IN A POSITIVE PLATE OF A LEAD-ACID STORAGE BATTERY

[75] Inventor: Erik G. Sundberg, Newtown Crossing, Pa.

[73] Assignee: Koehler Manufacturing Company, Marlborough, Mass.

[21] Appl. No.: 272,753

[22] Filed: Jun. 11, 1981

Related U.S. Application Data

[63] Continuation-in-part of Ser. No. 144,258, Apr. 28, 1980, abandoned.

[51] Int. Cl.³ .............................................. H01M 2/18
[52] U.S. Cl. .................................. 429/141; 429/144; 429/251; 429/254
[58] Field of Search .............. 429/140, 141, 144, 145, 429/238, 249, 253, 254, 251

[56] References Cited

U.S. PATENT DOCUMENTS

| | | | |
|---|---|---|---|
| 2,972,000 | 2/1961 | Boriolo | 429/140 |
| 3,081,368 | 3/1963 | Wunsche | 429/140 X |
| 3,429,752 | 2/1969 | Sundberg | 429/140 |
| 3,801,399 | 4/1974 | Sundberg | 429/238 X |
| 3,972,728 | 8/1976 | Sundberg et al. | 429/141 |
| 4,048,398 | 9/1977 | Sundberg | 429/140 |
| 4,048,399 | 9/1977 | Perzaghi | 429/141 |
| 4,144,115 | 3/1979 | Sundberg | 429/140 X |
| 4,205,709 | 6/1980 | Duschek | 429/140 X |
| 4,252,871 | 2/1981 | Sundberg | 429/140 |

*Primary Examiner*—Charles F. Lefevour
*Attorney, Agent, or Firm*—Hamilton, Brook, Smith & Reynolds

[57] ABSTRACT

Fabricated tubular bodies for use in a positive plate of a lead-acid battery are formed in a number of desirable ways from a mixture of fabrication components. In the invention methods the fabrication components are separated into differing sets of fabrication means, at least one of which sets consists of reinforced tapes. The mixture of fabrication components may, by braiding, cartridge-belt weaving or other processes, be arranged in predetermined relation to provide for highly effective retention and support of active material around current carrying grid portions of a positive plate when the said plate is immersed in an electrolyte of a lead-acid battery, to further provide preservation of dimensional stability and of said retention of active material over extended periods of operation of the said battery, and to still further provide for adequate communication between the active material and the electrolyte via tubular wall portions formed with a desirably controlled and predetermined porosity.

14 Claims, 37 Drawing Figures

TUBULAR BODIES FOR USE IN A POSITIVE PLATE OF A LEAD-ACID STORAGE BATTERY

This is a continuation-in-part of co-pending application Ser. No. 144,258, filed Apr. 28, 1980, now abandoned.

BACKGROUND OF THE INVENTION

Lead-acid batteries of the tubular type are customarily constructed with positive plates, constituent parts of which include: a grid member having a top bar; a post or burning lug and a plurality of current carrying spines in spaced relation depending from one side of the top bar; pencils of active material surrounding the current carrying spines; tubular bodies arranged to support and confine the pencils of active material and maintain such active material in contact with the current carrying spines; and means for closing ends of the tubes.

The tubular bodies are required to provide a number of functions including: enclosure and support of the active material to maintain said active material in contact with the spines; maintenance of the dimensional stability of the pencils of active material particularly during periods of swelling of the said active material; and, finally, provision of adequate communication between the electrolyte and the active material throughout the length of the tubular bodies.

"Porosity" is the term commonly employed to define the degree of communication between the active material and the electrolyte through the wall portions of the tubular bodies. Porosity can be further defined mathematically as the ratio of the surface area of openings in the wall portions to the overall surface area of the tubular bodies, commonly expressed in terms of a percentage.

In batteries which are intended for relatively high discharge rates the porosity of the tubular bodies may be relatively high, e.g. in the order of 50 to 70 percent. In batteries intended for low discharge rates porosity may be relatively lower, e.g. in the order of 30 to 50 percent.

With reference to the aforementioned functions of a tubular body, variables in the design of the tubular body of the class noted include: "strength", which is a function of the material selected and of the porosity; "volumetric displacement of electrolyte", which is a function of wall thickness and which will be increased if an overlapping seam is present within the wall; "porosity", previously defined and which may decrease should an overlapping seam be present in the tube wall if the pores in the overlapping portions do not precisely overlie one another; undesirable "gas polarization", i.e. impedance to the passage of gas bubbles which evolve during charging and which is related to the configuration of the pores, being greatest when the pores are round openings.

Obviously, an optimized tubular body will incorporate some compromise between the optimum values of these variables. The value of certain of the variables, e.g. porosity, strength, configuration etc., may be dictated by optimal design of the battery cell with respect to the use for which it is intended.

The prior art, recognizing these facts, has evolved four general types of tubes presently in use. The first is a double-wall structure having an inner seamless tube braided from staple fibers, usually glass or a mixture of glass and plastic, over which is formed an outer strength tube of lapped and seamed construction made from perforated polyvinyl choride sheet material. This type of tube provides certain disadvantages, for example: the wall thickness is relatively great; a lapped seam is present which increases volumetric displacement of electrolyte; the perforations or openings in the lapped portions may not overlie one another, thus reducing porosity at these portions; cost of perforation dies is extremely high so that changes in porosity are prohibitively expensive; and polyvinyl chloride may not be chemically inert in the electrolyte and thus may release harmful chlorides into the battery cell. The porosity of this type of tube is commonly expressed as the ratio between the area of the perforation of the sheet material to the total area of the tube in terms of a percentage.

The second type of tube is a seamless single-wall construction again braided from staple fibers but then impregnated with a stabilizing material such as a phenolic resin. This type of tube is less strong and less dimensionally stable than the first type, and the phenolic resin tends to break down during operation of the battery leaving the tube with little dimensional stability and this breakdown may introduce potentially harmful organic compounds such as acetic acid into the electrolyte. In some cases axially disposed fibers may be included in the braid.

The third type is a multiple tube array commonly woven from staple fibers on a cartridge-belt type loom. The structure is customarily impregnated with a stabilizing resin of a nature such as that noted above and which is subject to the same disadvantages.

The fourth type is also a multiple tube array formed from non-woven foraminous material, e.g. a needle-punched polyester, sheets of which are stitched or sewed together to form individual tubes.

All of these present configurations present compromises between the various cited requirements for an optimal tubular body. Changes in precise control of porosity and cross-sectional configuration are difficult or expensive to obtain in all cases, strength is compromised by mechanical design considerations, and some form of potential chemical contamination is generally present. In addition, such tubes are customarily made, shipped and stored in a generally cylindrical shape or other shape necessarily requiring a great deal of space which increases the cost of said shipment and storage.

SUMMARY OF THE INVENTION

The present invention relates to fabrication and formation of tubular bodies of the class used in positive plates of lead-acid batteries and to methods of making such tubular bodies utilizing improved techniques for selecting and arranging components in braiding or weaving procedures.

It is a chief object of the invention to devise and construct tubular bodies in which there is provided virtually complete control of variables such as has been outlined above, reference being had especially to such items as strengthening of tubular bodies, ability to maintain support and retaining means for active material in the tubular bodies, and provision of suitably designed usages of porosity characteristics whereby satisfactory communication between active material and battery electrolyte is achieved.

It is also an object of the invention to devise texturing techniques, particularly as involved in braiding, cartridge-belt weaving or other procedures, whereby tubular bodies of specially textured character may be produced not only in a finished state completely ready for installation and operation in a battery, but also in intermediate stages of finishing to constitute commercially saleable products which can be purchased and held by a customer in a compacted and rolled state until actual finishing and installation is to take place at some later date.

It is still another object of the invention to devise improved methods of texturing wherein fabrication components occurring in differing sets of preformed material are separately produced and brought together in uniquely united relationship. In this uniquely united relationship integrated masses of plastic material selectively distributed throughout the textured bodies are utilized with a degree of efficiency not heretofore believed to have been realized in the art of employing said plastic materials. It is also an object to control embedding of foraminous material in the said plastic material.

Yet another object of the invention is to derive formulations for mathematically selecting components and associated parameters for fabricating tubular bodies in accordance with varying customer requirements and specifications.

It has been determined that the proposed objectives may be realized by means of specially formed fabrication components and methods of handling. For example, it is found that strengthening of the tubular bodies to provide maintained support and retention of active material is achieved to a very considerable extent by forming a latticework from a set of fabrication components consisting of uniformly or otherwise spaced apart tapes which at a desired point in processing may undergo changes in state in response to externally applied means. These tapes, reinforced as hereinafter noted, are preshaped of a substantially rectangular cross-sectional configuration whose breadth equals and preferably exceeds their thickness.

The term "changes in state" as explained herein may include (1) integration of the tapes with one another; (2) partial embedding of foraminous material with the tapes; and (3) changes in chemical structure of some of the tape members.

Tapes of such a configuration, when arranged along oppositely directed paths of crossover, and when disposed flatwise with adjacent edges in spaced apart relation, define openings in an open grating-like structure or latticework, through and around which there may be introduced and compacted other sets or networks of fabrication components of a foraminous or porous nature to provide a textured tubular body. It has been determined that components and associated texturing parameters may be mathematically derived to satisfy customer requirements. In this way it becomes possible to establish a desirable communication of electrolyte with active material via the tube walls and, also, there may be realized a range of capillarity-induced "wicking" adaptable for maintaining communication between active material and electrolyte under varying electrolyte-level conditions in storage battery operation.

The foraminous fabrication components which are combined with the said tape latticework may occur in various forms. For example, a network of staple fibers such as glass fibers may be interwoven with the latticework or may be separately or concurrently woven inside of the latticework as may strips of foraminous material such as non-woven or needle-punched polyester members, or, as an alternative, a foraminous lapped tube may be located within the tape latticework.

The said tapes, when thus combined with the foraminous fabrication components may further assume a state of stability which, in the case of a tubular body, may provide for collapsibility without undue displacement of the differing sets of fabrication components with respect to one another. This may be of advantage, where extended lengths of the tubes are to be flattened out and wound into a roll for packaging and shipping as is hereinafter disclosed in detail.

In the invention means, in the partly finished form disclosed above, maintenance of retaining means in the form disclosed above, maintenance of retaining means in the tubular body of the invention is effectively achieved with a latticework made from sets of reinforced tapes in accordance with the invention combined with foraminous materials of various forms.

In tubular bodies of the invention, in a completely finished form where desired changes in state including integration of the reinforced tapes have been accomplished, still further advantages accrue in reference to maintenance of retaining means around active material in the tubular bodies.

It has been found that when a latticework made from a set of reinforced tapes, spaced apart from one another and having the breadth and thickness relationship noted earlier, is combined with foraminous fabrication components of the various forms as disclosed in the drawings, these foraminous components tend to compact between the spaced apart edges of the tapes and thus, when integration takes place, not only do the tapes become united integrally with one another at their points of crossover, but the foraminous components become embedded in the tape along undulating paths of distribution to impart a sinuosity characteristic which is inherent throughout the wall portions of the tube within which active material is to be retained.

In addition, the tapes present openings similar to those of a grating so that embedded masses extend continuously in angularly disposed relationship as a porous gridwork of great stability and resistance to swelling forces exerted by active material, and in which excellent communication between the active material and the electrolyte is realized.

In thus embedding foraminous material wherein a substantial degree of pressure may be desirable at the time of integration, it should be understood that the reinforcing means in the tapes are highly important in limiting the extent of penetration of the relatively hard foraminous components such as woven glass fiber or mixtures of glass fibers and other materials. Without the reinforcing means such tapes may be completely severed by the foraminous components with loss of their strengthening function.

In forming a tubular body from a latticework of the nature disclosed above there may be employed reinforced tapes consisting in part of either polymerized, e.g. thermoplastic materials, or unpolymerized materials. When unpolymerized materials such unpolymerized phenolic resins, unpolymerized polyesters, resins of the epoxy class or furan class are utilized a change in chemical structure consisting of polymerization is caused to take place in response to externally applied means. Polymerization of compounds of this nature may produce the integration of the invention at the points of embedding in the foraminous material into the surface of tapes and may further impart an increased degree of rigidity to the tubular body.

DETAILED DESCRIPTION OF THE INVENTION

The tubular bodies and their methods of formation utilizing braiding, cartridge-belt weaving or other texturing techniques as disclosed in FIGS. 1-26 have evolved from the general objectives earlier noted of dealing with the variables inherent in the operation of positive plates for lead-acid batteries. In seeking to optimize combinations of materials useful for such purposes there has been developed a concept of texturing based upon arranging fabrication components in the form of sets of flat tapes into an open latticework of grating-like configuration throughout which spaced rows of openings may extend in angularly disposed relation to one another in a controlled manner.

Combined with this open latticework are differing sets of fabrication components, for example, glass fibers, polyester fibers and mixtures of the same, extending across and through the spaced rows of openings in the latticework along intertwining paths of sinuosity to substantially fill or close the rows of openings. These paths of sinuosity intersect one another in a manner such that overlapping tape portions, even prior to integration, are locked into relatively fixed patterns highly resistant to forces of deformation such as those engendered by stretching, twisting, expanding and the like.

It is contemplated that use of a latticework of reinforced tapes in which is interbraided foraminous material provides a textured product which may be referred to as a composite tubular body of a seamless single-wall construction and may be useful for various purposes in the structural state described above where no integration has taken place. This composite tubular body and its method of fabrication is illustrated in FIGS. 1–7. It should be understood, however, that the latticework of reinforced tapes is not limited to a composite single-wall tube and may be employed in various ways as illustrated in the remaining figures of the drawings to form multi-wall structures of a desirable nature.

Figures 1, 2, 2A, 3, 4, 5, 6, 6A:
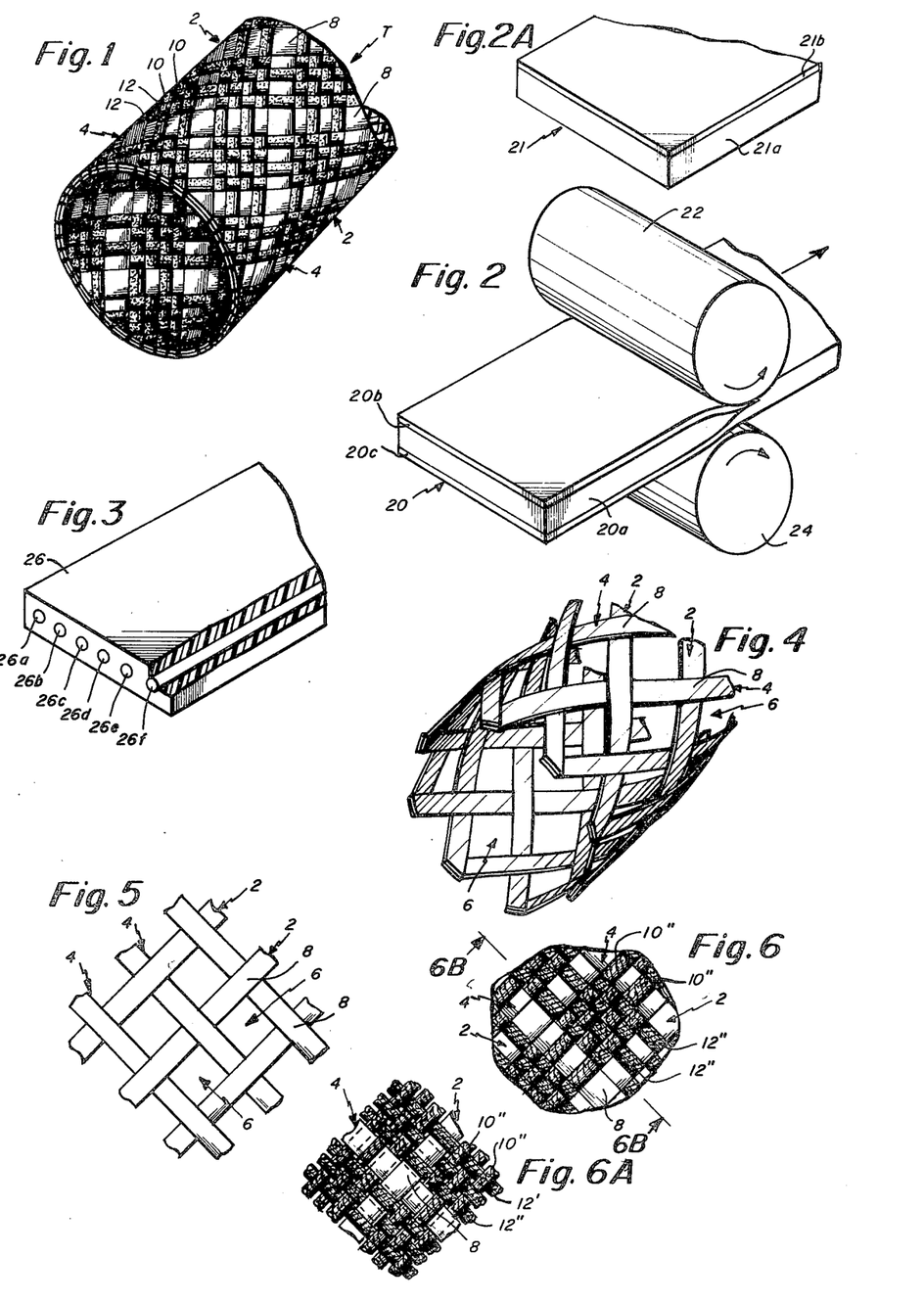
FIG. 1 is a perspective view of a composite textured tubular body of the invention employing thermoplastic bearing tape components.
FIG. 2 is a detail perspective view of a thermoplastic tape bearing component of the invention illustrating one desirable form of reinforcing and showing an optional edge covering step.
FIG. 2A is a view similar to FIG. 2 showing a modified form of reinforcing.
FIG. 3 is a perspective view of another form of reinforced tape component showing reinforcing elements disposed longitudinally therethrough.
FIG. 4 is a perspective view of the helical latticework of tapes of the invention.
FIG. 5 is a fragmentary enlargement of the latticework of FIG. 4.
FIG. 6 is a fragmentary enlargement of a portion of the structure shown in FIG. 1.
FIG. 6A is a fragmentary view similar to FIG. 6 but showing in further detail the arrangement of components.

Referring in more detail to FIGS. 1–7, there is illustrated in FIG. 1 a preferred form of braided seamless tubular body of composite type generally denoted by the arrow T. Included in this seamless tubular body T, in accordance with the invention, are two sets of fabrication components. The first set consists of reinforced tapes generally denoted by arrows as 2 and oppositely directed tapes generally denoted by arrows as 4, which are more clearly shown in FIGS. 4 and 5. As will be noted therein, the reinforced tapes are arranged in uniformly spaced relation and extend in oppositely directed helical paths to define a seamless tubular latticework having openings as denoted by arrows as 6, shown also in detail in FIGS. 4 and 5. It will also be noted that at spaced apart points portions of the tapes overlap one another as shown by numerals as 8.

It should further be ovserved that the openings as 6 are quadrilateral in configuration thus minimizing undesirable gas polarization.

Figures 6B, 7, 8, 9:
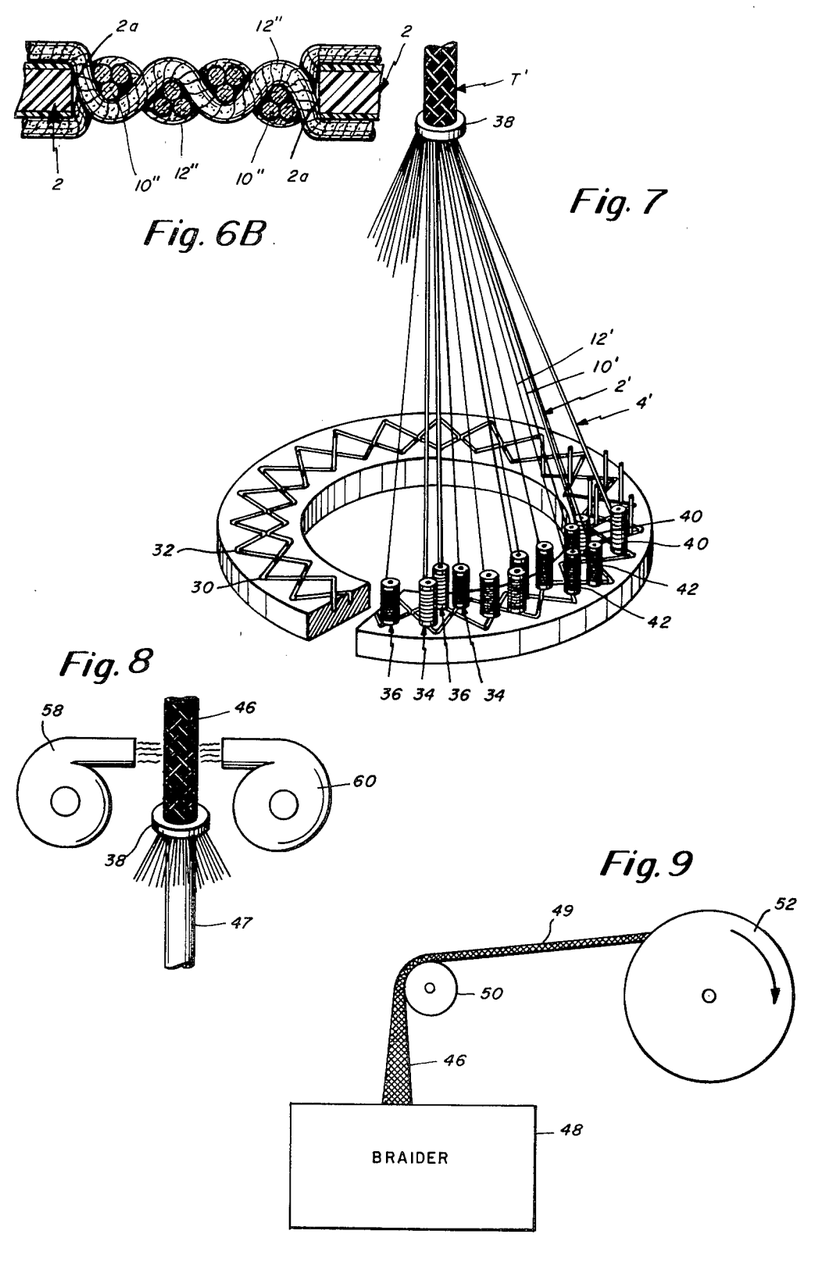
FIG. 6B is a view taken on the line 6B—6B of FIG. 6.
FIG. 7 is a perspective view illustrating schematically the assembly of components of the composite tube of FIG. 1.
FIG. 8 is a detail view of an optional step of partially integrating the composite tube of FIG. 1.
FIG. 9 is a schematic view illustrating a step in a method of collapsing a tube of invention as shown in FIG. 1 and winding it into a rolled form.

Further, in accordance with the method of the invention, there is utilized a second set of angularly disposed fabrication components, indicated by arrows as 10 and 12, which are of a foraminous nature and which may consist, for example, of staple fiber such as glass, polyester or mixtures thereof which may be formed into twisted bodies as shown in FIG. 6. The two sets of fabrication components are combined together in a specially controlled single braiding operation as is illustrated in FIG. 7 to produce the composite textured tubular body of FIG. 1.

It is pointed out that the reinforced tapes may be of two general types: (1) reinforced tapes bearing an outer thermoplastic material; and (2) reinforced tapes of an unpolymerized material capable of polymerizing in situ by utilization of an externally applied polymerizing means.

The invention will first be described with respect to utilization of thermoplastic bearing tapes as noted above. In one desirable form of the invention there may be employed in the latticework a first set of fabrication components consisting of reinforced tapes bearing a thermoplastic material. Important in such tapes is the inclusion of reinforcement means such as shown in FIGS. 2, 2A and 3. In the case of FIG. 2, the tape may be denoted by arrow 20 and is of a laminated construction consisting of an inner reinforcing layer 20a of a polyester compound, for example, and fusible outer layers 20b and 20c of a thermoplastic material chemically inert in the electrolyte of a lead-acid battery, for example, a polyolefin such as polyethylene or polypropylene.

It may also be desired to provide means for covering exposed edges of the reinforcing components 20a with overlying thermoplastic outer layers. As shown in FIG. 2, there may be employed rollers 22 and 24, shaped as shown, to compress edges of the layers 20b and 20c over against one another as suggested at the upper right hand end of the tape structure. The polyester component 20a may be pre-stretched to orient the molecules of the polyester in a longitudinally directed manner.

It may be desired to provide a laminated tape in which one of the thermoplastic layers is omitted. Such a tape is illustrated in FIG. 2A and generally denoted by arrow 21. Here a polyester layer 21a has laminated to one side thereof a layer 21b of a thermoplastic material such as a polyolefin.

Other materials may be used in the laminated tapes of FIG. 2 and FIG. 2A. For example, oriented polypropylene may be substituted for the polyester layer 20a or 21a (FIG. 2 and FIG. 2A), the only requirement being that the fusible outer layers as 20c, 20b and 21b have a lower softening temperature than 20a or 21a.

In FIG. 3 another desirable form of reinforced thermoplastic tape has been illustrated and includes a fusible thermoplastic tape body 26 having included therein filaments spaced apart as indicated at 26a, 26b, 26c, etc. and extending longitudinally within the tape. The filaments may be glass, polyester, a mixture of the two, or the like; advantages of glass include resistance to elongation, while advantages of polyester include high tensile strength.

The method of texturing which has been devised to produce the composite tubular body of FIG. 1 is based on the concept of suitably locating spools of thermoplastic tape in a braiding machine and also in suitably positioning other spools of glass fibers or other foraminous material in varying forms. This relative positioning of fabrication components has been illustrated diagrammatically in FIG. 7, with it being kept in mind that changes in degree of porosity may be varied quite sharply by controlling the dimensional relationship between the pores or spaces 6 and the total surface area of the textured tubular body of FIG. 1.

Figure 27:
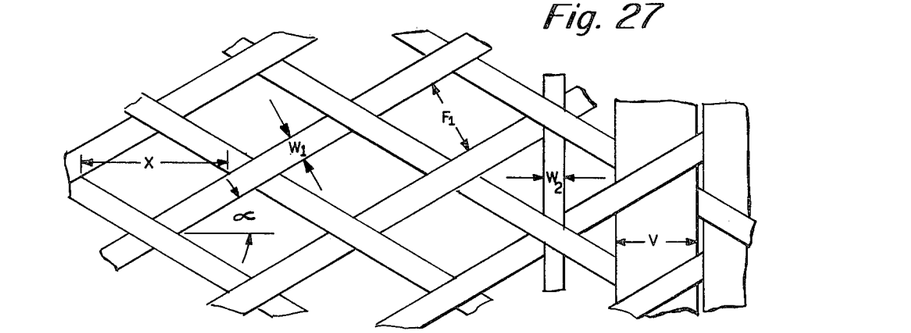
FIG. 27 is a detail view of a latticework of tape indicating diagrammatically variables which may be employed in mathematically selecting components and associated texturing parameters.

The above relationship may be controlled by proper selection of various texturing parameters such as spaced relationships of the tapes, the number of tapes, the width of the tapes, etc. These parameters may be expressed and determined mathematically; disclosure of these procedures will be set forth hereinafter with respect to the description of FIG. 27.

FIG. 7 illustrates schematically a tubular braiding machine arranged to produce a composite tube T' similar to that shown as T in FIG. 1. In this type of machine there are two groups of feed spools and, customarily in such machines, there is provided means for travelling each of the spools within an annular area. One group of feed spools, generally denoted by arrows as 34, travels in a clockwise direction as viewed in FIG. 7 along a path indicated by numeral 30. Another group, generally denoted by arrows as 36, travels in a counter-clockwise direction along a path indicated by numeral 32, each spool following its respective intersecting path of travel. Material is drawn from the feed spools into a common forming ring 38 from which the braided tube T' emerges. The components of the braid follow opposed helical paths around the central axis of the tube. Certain of the spools as 40 will be loaded with reinforced thermoplastic tapes indicated by arrows as 2' and 4'. Other spools as 42 will be loaded with staple fibers as 10' and 12'. If tapes as 2' and 4' are sufficiently wide so as to overlie staple fibers fed from spools adjacent to the spools as 40 when in the braided tube T', said adjacent spools may be left empty to eliminate wastage of staple fiber. Staple fibers as 10' and 12' are introduced between the tapes in interbraided relationship. Selection of various braiding parameters, for example tape width, rate of feed, number of tapes, etc., to produce optimal tube characteristics with respect to porosity, degree of interlocking between the sets of components, etc. will be discussed at a later time with respect to FIG. 27.

The textured tubular body of FIG. 1 as it is braided in the manner described and illustrated in FIG. 7 occurs in a continuous length of material which may be processed in various ways as earlier noted.

FIG. 6 is a portion of the tubular body of FIG. 1 somewhat enlarged in which the inter-raided relationship between the tapes as 2 and 4 and foraminous components similar to 10 and 12 of FIG. 1 is illustrated. In this FIG. 6 foraminous components as 10" and 12" are shown as twisted yarns comprising a plurality of fibers. FIG. 6B is a portion of this structure still further enlarged and shown in cross-section, illustrating edges as 2a of spaced apart tape components as arrows 2, for example, effectively compacting therebetween the staple fiber yarns as 10" and 12", which in turn capture and confine overlapping portions as 8 of the tape components as shown in FIG. 6. This relationship of components is shown in plan view in FIG. 6A, still further illustrating the overlapping parts of the tapes as indicated at 8.

In thus capturing and confining the overlapping portions 8 throughout the tubular body all of the overlapping portions as 8 and the foraminous components are maintained in a desirably fixed relationship which tends to resist displacement. It will be evident from the interbraided relationship of the various components that each of the foraminuous components will assume a sinuosity characteristic forced upon it by the undulating nature of the braid thus enhancing the resistance to deformation of the tubular body.

One preferred method of further processing is illustrated in FIG. 9. This figure shows a step of guiding braided tube 46 as it leaves a braiding machine 48 in a tubular form upwardly over a guide 50 which collapses the braid tube into a flattened shape, indicated by numeral 49, which may in turn be wound on a storage reel 52 in some desired size is then ready to be stored for future use or may be packaged for shipment to a required destination.

When braided tubing is packaged and shipped on reels in the flattened form described, significant economic advantages are realized. Since the volume of the collapsed tubing will be significantly less than that of uncollapsed tubing, shipping costs (which are based upon volume as well as upon weight) for a given length of tubing will be markedly less. In addition, space required for storage of tubing will b reduced, again producing considerable monetary savings.

In the method described above no integration of thermoplastic material need take place at the time of braiding, collapsing and winding on reels. However, if desired, the material may undergo a partial "tack" or surface fusion as is suggested by FIG. 8 in which braiding takes place over a mandrel 47 and, subsequently, the braided material 46 is exposed to heating means such as the hot air blowers 58 and 60 after the material leaves the common forming ring 38. Hot air blowers 58 and 60 produce partial softening of the thermoplastic material 20b and 20c (FIG. 2) of the tapes so that these surfaces become adhered to one another.

In such a partial fusing operation it may be desired to provide mandrel 47 with a surface of a non-sticking material as Teflon ®. However, if a laminated tape of the form shown in FIG. 2A is employed and positioned such that polyester layer 21a is located against mandrel 47, the mandrel need not have a non-sticking surface characteristic.

Figure 10:
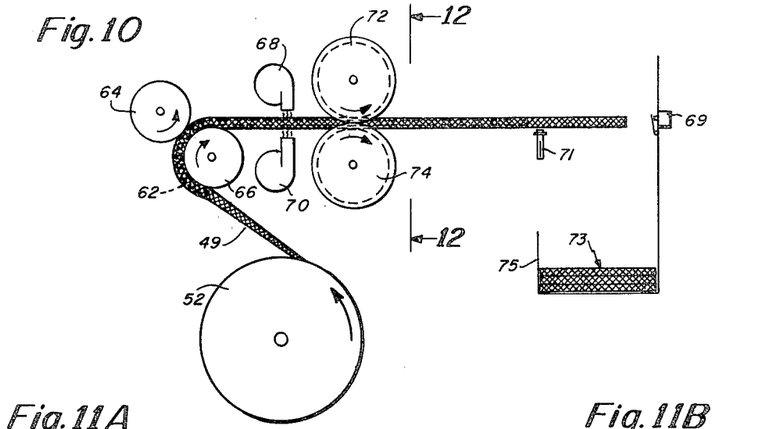
FIG. 10 is another schematic view illustrating steps in a method of shaping, integrating and cutting the tube of FIG. 9 to a desired length.

Further processing may take place as illustrated in FIG. 10. Collapsed tubing 49 is fed from wound reel 52 (reference FIG. 9) onto a forming mandrel 62, drawn by drive wheels 64 and 66. The mandrel 62 may be of some desired cross-section, for example circular, rectangular, etc.

As the collapsed tube becomes expanded in passing over the mandrel 62, as shown in FIG. 10, it is contained between friction drive wheels 64 and 66 which advance the expanded tube along a path passing between heating elements 68 and 70 which heat the thermoplastic material to a desired range of temperatures for fusion integration, which range is well known in the art.

The heated tubing then passes between pressure rollers 72 and 74 which provide pressure required for fusion integration of tape components and embedding of staple fibers into thermoplastic surfaces of the tape components; the tubing then is advanced until it comes into contact with a limit switch 69 which triggers a cutting device 71. Cut lengths, as denoted by arrow 73, are then received in a receptacle 75.

Cooling of the tubing, which finally fixes the fusion integration and embedding of components, takes place during and following the application of pressure; for this reason it may be desirable to provide mandrel 62 and portions of pressure rollers 72 and 74 with non-sticking surfaces. Heat, pressure, and cooling may be provided by other forms of apparatus without departing from the method of the invention.

Figures 11A, 11B:
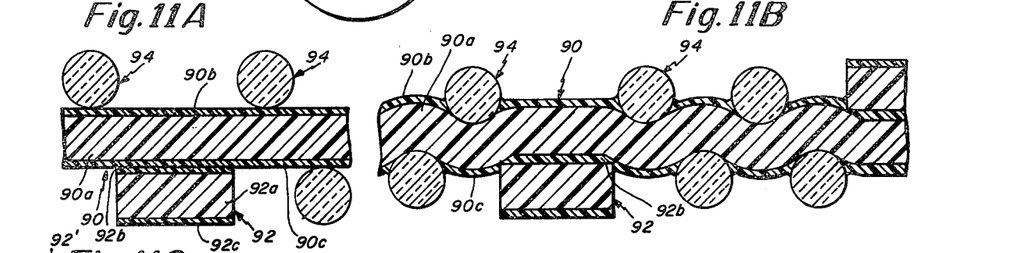
FIG. 11A is a detail view illustrating on a greatly enlarged scale thermoplastic bearing tapes and staple fibers prior to integration.
FIG. 11B is another detail view similar to FIG. 11, but illustrating integration of tapes at their points of crossover, and also illustrated is the embedding of staple fibers in the intervening spaces between the tapes.

FIGS. 11A–11D illustrate diagrammatically fusion integration of thermoplastic tapes with one another as well as fusion embedding of staple fibers in the thermoplastic surfaces of the tapes. Referring to FIG. 11A, arrow 90 indicates a reinforced thermoplastic tape of the invention having, for example, a center core 90a of polyester and outer layers 90b and 90c of polyolefin (e.g. polyethylene or polypropylene) shown in longitudinal cross-section. Arrow 92 indicates an angularly disposed thermoplastic tape having a similar core 92a and outer layers 92b and 92c. Arrows as 94 indicate staple fibers. The various components cited are shown in unfused relationship.

FIG. 11B illustrates these same components after they have been subjected to the fusing and shaping process of FIG. 10. Thermoplastic tape 90 now evidences a sinuous configuration forced upon it by the pressure from rollers 72 and 74. Staple fibers as 94 become embedded into thermoplastic surfaces 90b and 90c to an extent limited by the central polyester core 90a. Portions as 92b of tapes as 92 become fused with portions 90b and 90c of tape 90 such that the thermoplastic surface 92b becomes fusion integrated into a single mass with the thermoplastic surface 90b (or 90c) of tape 90 by the combination of heat and pressure as suggested in FIG. 10.

Tapes such as shown in FIG. 2A may be similarly employed; in this case polyester cores of the tapes become fusion embedded in the thermoplastic layers of other sets of tapes.

Figure 11C:
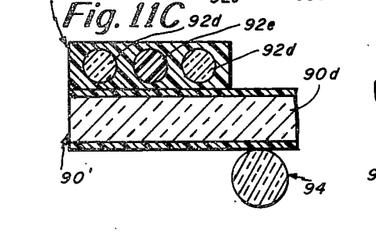
FIG. 11C is a view similar to FIG. 11A, but illustrating tapes having reinforcement means comprising longitudinally disposed filaments.
Figure 11D:
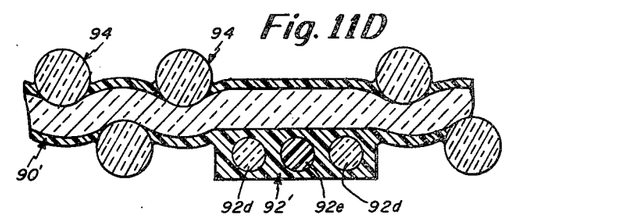
FIG. 11D is a view similar to 11A, but illustrating the tapes of FIG. 11B.

FIG. 11C is a view very similar to that of FIG. 11A, except that the tapes as 90', 92' are reinforced by internally disposed filaments as 90d, 92d and 92e. These filaments may be formed of glass fibers (90d, 92d), polyester (92e), or mixtures thereof. Fusion integration and embedding take place as before; the depth of embedding of fibers as 94 is limited by the reinforcing filaments 90d, 92d and 92e. The resulting fused relationship of parts is shown in FIG. 11D.

In addition to providing fusion integration, pressure rollers 72 and 74, in combination with mandrel 62, also provide shaping of the tubing to a final desired cross-sectional configuration.

Figure 12:
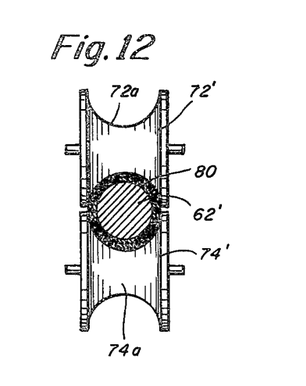
FIG. 12 is a view taken on the line 12—12 of FIG. 10 showing pressure roller and mandrel means producing a circular tube configuration.

FIG. 12 illustrates pressure roller and mandrel apparatus similar to that shown in FIG. 10 for fusing and forming a circular tube 80. Shaping surfaces 72a and 74a of pressure rollers 72' and 74' are circularly recessed and compress the tube 80 over a mandrel 62' of a circular cross-section.

Figures 13, 14:
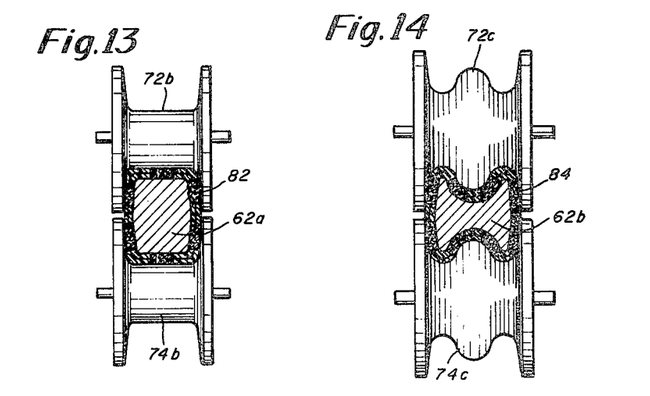
FIG. 13 is a view similar to FIG. 12, but showing roller and mandrel means producing a rectangular tube configuration.
FIG. 14 is a view similar to FIGS. 12 and 13, but illustrating still another roller and mandrel means producing another tube configuration.

FIG. 13 illustrates apparatus for forming a rectangular tube 82 in which the shaping surfaces 72b and 74b of rollers similar to 72 and 74 are rectangularly recessed and mandrel 62a is of a corresponding rectangular cross-section.

FIG. 14 illustrates apparatus similar to that of FIG. 12 and FIG. 13 for producing another tube shape 84. Mandrel 62b and shaping surfaces 72c and 74c of rollers similar to 72 and 74 will be of a suitable configuration.

Figures 15, 16:
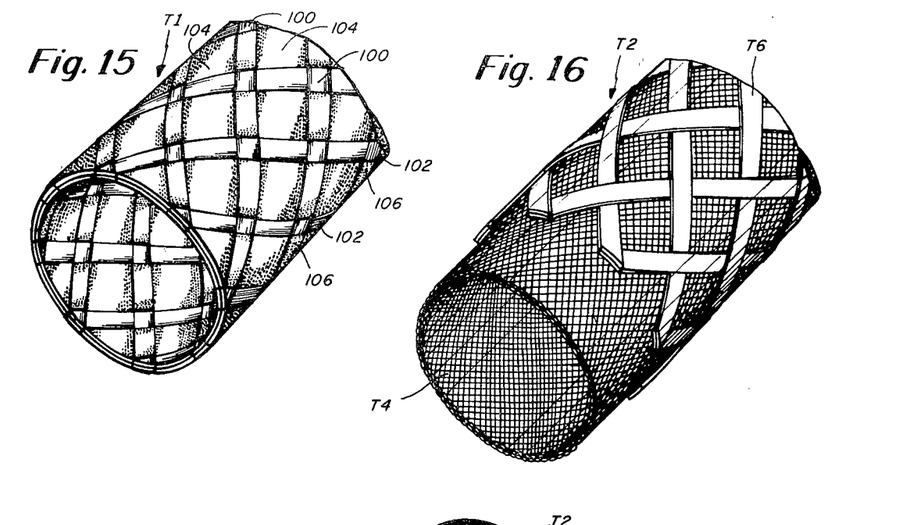
FIG. 15 is a composite tube of the invention in which a latticework of thermoplastic bearing tapes is illustrated with strips of a non-woven foraminous material interbraided therewith.
FIG. 16 is a perspective view of a modified form of tubular body comprising a latticework of thermoplastic bearing tapes braided around an inner tube portion braided of staple fibers.

FIG. 15 illustrates another embodiment of the composite tube of the invention, in which staple fibers are replaced by strips of non-woven foraminous material. In this Figure a tube designated by arrow T1 comprises a helical lattice of angularly disposed reinforced thermoplastic tapes as 100, 102 interbraided with angularly disposed strips as 104, 106 of a non-woven foraminous material.

As in the previous arrangement, the foraminous material is interbraided with the reinforced thermoplastic tapes of the helical latticework. Fusing, embedding and shaping takes place in the manner described in connection with earlier Figures.

Another embodiment of the invention comprises a double-walled tubular structure earlier noted and similar to that shown in FIG. 16. In this Figure, arrow T2 refers to a double-walled tube comprising an inner tube portion T4, braided in a conventional manner from staple fiber, over which is braided in accordance with the invention a seamless tubular helical latticework T6 similar to that illustrated in FIG. 4.

Figure 17:
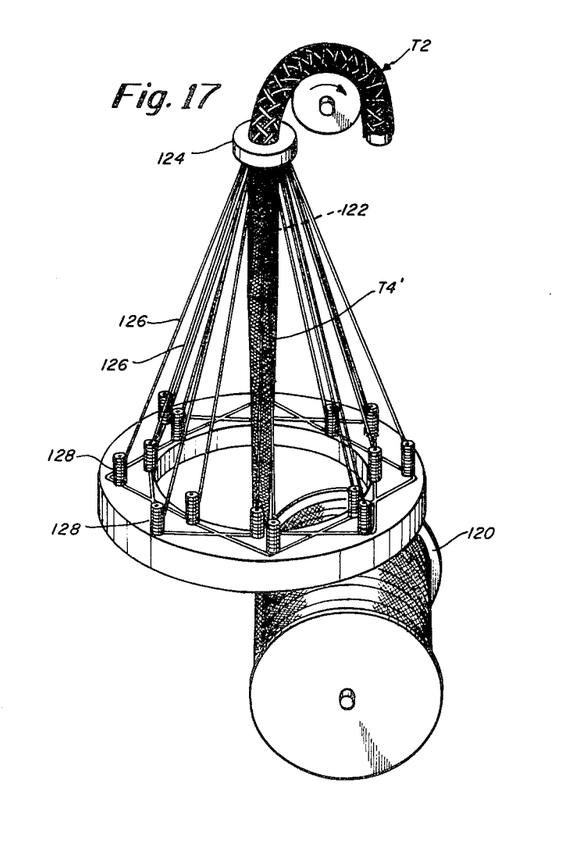
FIG. 17 is a perspective view illustrating a step of braiding the latticework of tape around a fibrous braided inner tube portion of staple fiber to produce the tube shown in FIG. 16.

The tube T2 of FIG. 16 may, for example, be fabricated using a braiding technique as illustrated in FIG. 17. In this Figure the braided fiber inner tube portion T4' has been previously produced in a continuous length and rolled into flattened form on a reel 120. The tube portion T4' in collapsed form is threaded over a mandrel 122 and then drawn through a forming ring 124.

Tapes as 126 are fed from spools as 128 in the previously described manner, and are braided over tube portion T4' to provide the double-walled structure arrow T2. Control of porosity, strength, etc. is accomplished by regulating the braiding parameters associated with forming the latticework T6. As will be obvious to one skilled in the braiding art, inner and outer tube portions may be braided simultaneously using a "2-deck" machine (not illustrated in the drawing). It may also be desired to heat the double-walled tube of FIG. 16 in a manner similar to that illustrated in FIG. 8 so that a "tack" fusing takes place particularly when the double-walled product is to be wound into a reel for storage and shipment.

The double-walled structure T2 of FIG. 16 may be fusion integrated and shaped to a desired configuration in a manner similar to that previously described.

Figure 18:
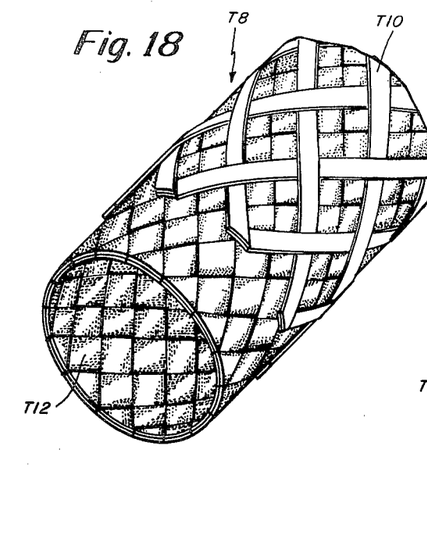
FIG. 18 is a perspective view of a tube similar to FIG. 16, but showing the inner tube portion comprising braided strips of non-woven foraminous material.

FIG. 18 illustrates another form of double-walled tube denoted by the arrow T8 in which an outer latticework T10 similar to that shown in FIG. 4 is braided from thermoplastic tapes over braided inner tube portion T12 comprising strips of non-woven foraminous material similar to 104 and 106 of FIG. 15.

Figure 19:
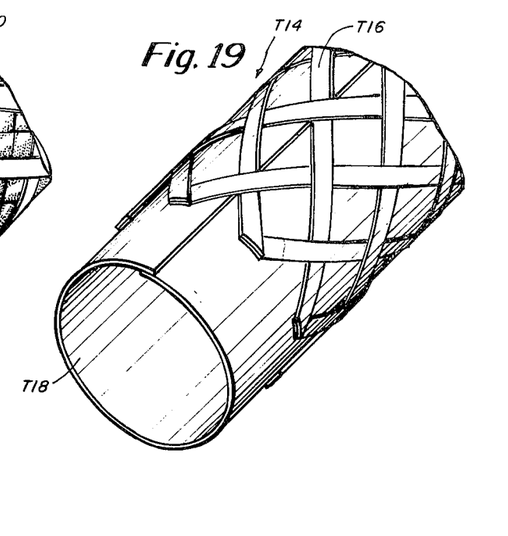
FIG. 19 is a view similar to FIG. 16, but showing the inner tube portion comprising a lapped tube of foraminous sheet material.

FIG. 19 illustrates yet another embodiment of double-walled tube structure, denoted by arrow T14, in which is combined a latticework T16 of reinforced thermoplastic tape similar to that shown in FIG. 4, braided over lapped inner tube portion T18 formed from a sheet of foraminous material.

Figure 20:
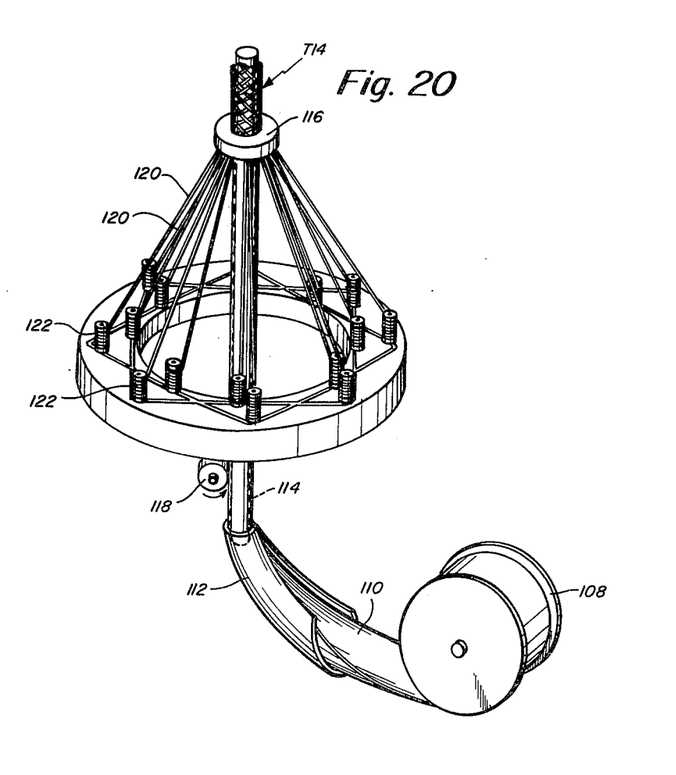
FIG. 20 is a perspective view showing schematically details of making the tube of FIG. 19.

FIG. 20 illustrates schematically a means of producing the tube of FIG. 19. Referring in detail to FIG. 20, numeral 108 denotes a reel upon which is wound a continuous strip 110 of foraminous material, e.g. non-woven polyester.

Sheet material 110 is introduced into forming means 112 and threaded over a mandrel 114, and thereafter advanced through common forming ring 116 by friction drive wheel 118. Tapes as 120 are fed from spools as 122 and braided over the formed inner tube portion to provide a double-walled structure T14, as illustrated in FIG. 19.

It may be desired in some cases, particularly with respect to double-walled tube structures, to treat the tape latticework so that it may not be axially stretched or elongated during the braiding process. This can be accomplished by the inclusion of axially disposed tapes within the braided latticework.

Figure 21:
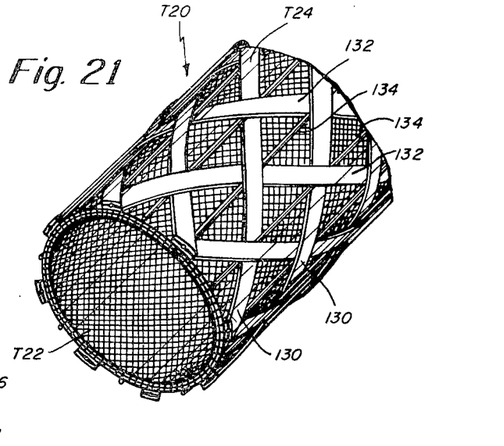
FIG. 21 illustrates a tube similar to that of FIG. 16, but having axially disposed tapes included in the latticework.

FIG. 21 illustrates a double-walled tube denoted by arrow T20 (similar to tube T2 of FIG. 16) in which an inner tube portion T22 braided from staple fiber is surrounded by a braided tape latticework T24 comprising helically disposed tapes as 130 and 132 and axially disposed tapes as 134.

Figure 22:
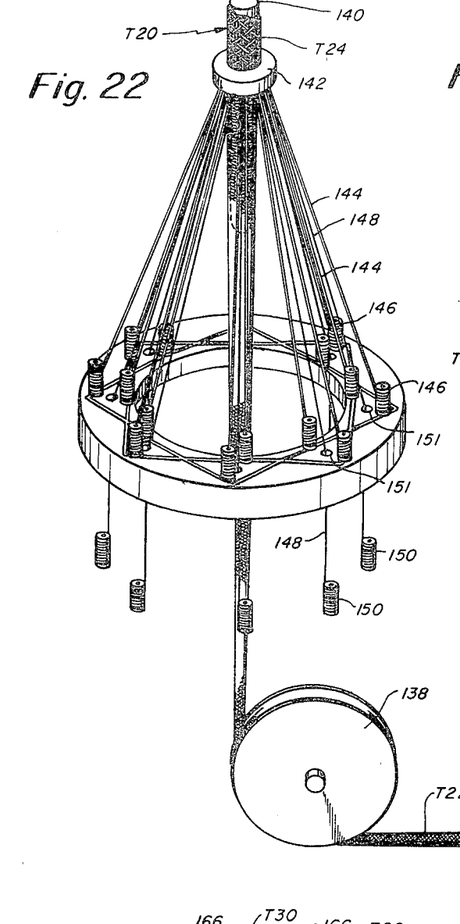
FIG. 22 is a perspective view illustrating diagrammatically fabrication of the tube of FIG. 21.

FIG. 22 illustrates diagrammatically a method of producing the tube of FIG. 21. It will be noted that the apparatus illustrated is very similar to that shown in FIG. 17. Braided inner tube portions T22' are fed from a reel 136 in collapsed form over a guide roll 138, threaded over mandrel 140 and forced through common forming ring 142.

Helically oriented tapes as 144 are fed from spools as 146 in the same manner as described in connection with earlier figures. Axially disposed tapes as 148 are fed from stationary spools as 150 through holes as 151 and into the common forming ring 142 and interbraided with tapes as 144 to produce the outer tube portion T24 (FIG. 21). The resulting tube T20 may be fusion integrated and processed as previously described.

Figure 23:
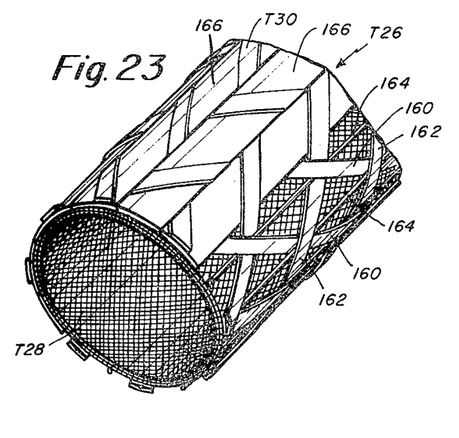
FIG. 23 is a view similar to FIG. 21, but showing some of the axially disposed components masking off a portion of the tube wall.

It may be desired to provide tubes for special purposes in which the tube is not porous for a portion of its outer periphery. Such a tube, commonly used as "end tubes" of positive plates, may be fabricated using the means and method similar to those described in connection with FIG. 22. FIG. 23 illustrates such a tube, denoted by the arrow T26, comprising an inner tube T28 braided from staple fiber over which is braided a latticework T30 comprising helically disposed tapes as 160, 162, axially disposed tapes as 164 and axial masking tapes as 166. The tube T26 may be produced in the apparatus shown in FIG. 22, the only difference being that some of the stationary spools as 150 will be loaded with wider tapes as 166. The width of tapes 166 is selected of a size such that they substantially abut one another and provide a masking function.

A similar masking function may be provided in single-wall tubes similar to those shown in FIGS. 1–15, by employing a method similar to that shown in FIG. 20. A continuous strip of laminated thermoplastic material of the composite form of FIG. 2A, having a width equivalent to that peripheral portion of the composite in which masking is desired, is introduced into forming means, advanced over a mandrel with its polyester surface against the mandrel, and thereafter advanced through a common forming ring. A composite tubular body, similar to those shown in FIGS. 1–15, is then braided over the formed strip. Fusion integration, shaping, etc. are carried out as before.

Figure 24:
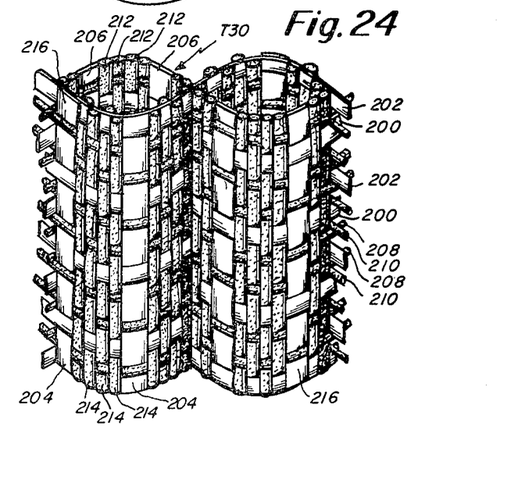
FIG. 24 is a view illustrating a multiple tube arrangement of thermoplastic bearing tapes and staple fibers interwoven in cartridge-belt form.
Figure 25:
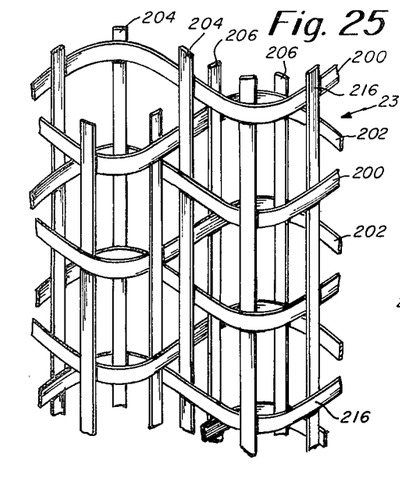
FIG. 25 is a perspective view showing the tape latticework of the multiple tube arrangement of FIG. 24.
Figure 26:
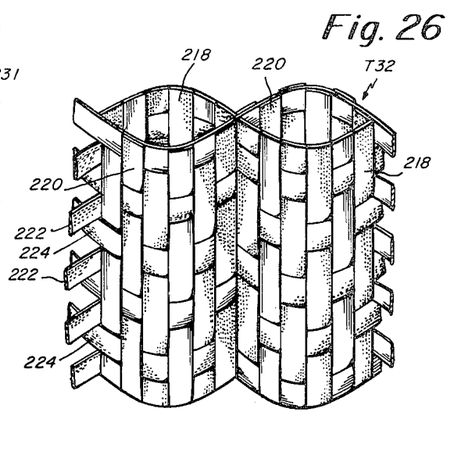
FIG. 26 is another multiple tube arrangement similar to FIG. 24, but having strips of non-woven material replacing the staple fiber.

All of the advantages and desirable features of single-walled tubes which have been illustrated in FIGS. 1–15 may be realized to a very large extent in multi-tube structures of the class commonly referred to as cartridge-belt loom woven tubes. FIGS. 24–26 illustrate such structures.

Arrow T30 (FIG. 24) illustrates such a structure woven from a plurality of sets of thermoplastic tapes and staple fibers. The plurality of sets includes four distinct sets of thermoplastic tapes as 200, 202, 204, 206 as shown in FIG. 25; four sets of staple fibers, as 208, 210, 212, 214, are interwoven as shown in FIG. 24. The interwoven tape structure is illustrated as arrow 231 in FIG. 25.

As is customary in weaving with a cartridge-belt type loom, a series of interconnected tubular sections is continuously produced with the central axis of each section being normal to the path of advancement of the interconnected tubular sections. The series may be of any desired length and may be wound on a storage reel from which there may be drawn off any required number of tubular sections. Thereafter the required number of sections may be separated and fused at their points of separation. Following fusion and separation, it is then desirable that overlapping tape portions as 216 in each tubular section be fusion integrated with one another and that staple fibers as 208, 210, 212, 214 become embedded in the surfaces of the tapes as 200, 202, 204, 206 as disclosed above.

This may be accomplished by providing an array of spaced apart mandrels, heating means and pressure rollers (not shown in the drawings).

FIG. 26 illustrates a modification of a multi-tube structure similar to that of FIG. 24, in which the staple fibers of the weave are replaced by strips of foraminous material, e.g. non-woven polyester, as denoted by numerals as 218, 220, 222, 224.

As previously noted braiding or weaving parameters for all of the embodiments now described may be derived and calculated mathematically. For braided bodies of the single-tube class having no axially disposed tapes (FIGS. 1–14), the variables or parameters include:
  d = desired tube diameter
  n = number of helically disposed tapes either in a clockwise or a counter-clockwise direction (must be an integer).
  $P_1$ = porosity of foraminous material (to be established by conventional methods).
  $P_2$ = porosity of the tape latticework defined as the ratio between the openings in the latticework and the total surface area of the tubular body.
  $P_3$ = total porosity of the tube wall
  $W_1$ = width of individual helically disposed tapes (see FIG. 27).
  Z = the number of crossovers of center lines of helically disposed tapes per unit of tube length (related to rate-of-advance of the braided tubular body).
  X = edge-to-edge distance between parallel helically disposed tapes, in a plane normal to the central axis of the tube (see FIG. 27).
  $F_1$ = edge-to-edge distance between parallel helically disposed tapes, in a plane normal to the central axis of the tapes (see FIG. 27).
  $F_2$ = width of individual foraminous components
  $\alpha$ = angle between helically disposed tapes and the normal to the central axis of the tube.
  m = number of foraminous components confined between adjacent parallel helically disposed tapes.

Mathematical relationships include:

$$P_2 = P_3/P_1$$

$$Z = 1/((\pi d/n) \tan \alpha)$$

$$W_1 = \sin \alpha \, (\pi d/n)(1 - \sqrt{P_2})$$

$$P_2 = \frac{((\pi d/n) - (W_1/\sin \alpha))((\pi d/n) \tan \alpha - (W_1/\cos \alpha))}{(\pi d/n)^2 \tan \alpha}$$

$$X = (\pi d/n) - (W_1/\sin \alpha)$$

$$F_1 = X \sin \alpha$$

$$F_2 = F_1/m$$

Customarily certain of the variables will be defined by the desired characteristic of the tubular body, to wit:
  d
  $P_1$
  $P_3$ The remaining variables can be calculated from the relationship above, bearing in mind that multiple solutions may be possible. It may, for example, be desired to specify as well the angle $\alpha$ which is related to the strength of the tube, and "n", which may be dictated by the configuration of the braiding machine.

Given the above variables (d, $P_1$, $P_3$, $\alpha$, n) porosity $P_2$ may be readily calculated; width $W_1$, distance X, Z and $F_1$ readily follow. Parameter "m" will also normally be predefined; width $F_2$ may also be readily calculated. If other variables are specified the relationship may be manipulated algebraically to determine values for the unspecified variables.

When axially disposed tapes are to be employed for masking purposes, the width V of such masking tapes (see FIG. 27) may be calculated by the relationship $$V = \pi d/2n$$

Where axially disposed tapes are to be included in the braid for strengthening purposes (see FIG. 21), the width $W_2$ of such axially disposed tapes (see FIG. 27) will normally be specified with reference to the strength desired.

Where $W_2$ is less than or equal to $$W_1/\sin \alpha$$

porposity $P_1$ may be calculated by $$P_2 = \frac{\{((\pi d/n) - W_2 - (W_1/\sin\alpha))((\pi d/n) - W_2)\tan\alpha - (W_1/\cos\alpha))\}}{(\pi d/n)^2 \tan\alpha}$$

Where $W_2$ is greater than $$W_1/\sin\alpha$$

porosity $P_2$ may be calculated by the relationship $$P_2 = \{\tfrac{1}{2} ((\pi d/n) - W_2 - (W_1/\sin\alpha)) (((\pi d/n) - W_2) \tan\alpha - (W_1/\cos\alpha)) - 2 (W_2 - (W_1/\sin\alpha))^2 \tan\alpha\} / \{\tfrac{1}{2} (\pi d/n)^2 \tan\alpha\}$$

Optimization of width $W_1$ will be carried out in an iterative solution of the above relationships.

Multi-tube structures woven in a cartridge-belt loom will be calculated in a somewhat different manner.

Figure 28:
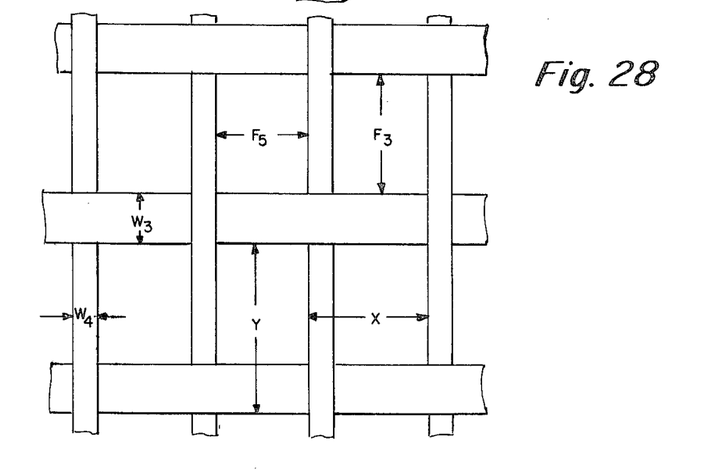
FIG. 28 is a view similar to FIG. 27, but indicating variables which may be mathematically employed with respect to multiple tube arrangements of cartridge-belt form.

Variables include:
d = tube diameter
$n_1$ = number of horizontally disposed tapes in a single-tube wall
$n_2$ = number of vertically disposed tapes in one-half of an indicated tube section
$P_1$ = porosity of foraminous material
$P_2$ = porosity of the tape structure (see FIG. 25)
$P_3$ = desired porosity of the tube wall
$W_3$ = width of horizontally disposed tapes (see FIG. 28)
$W_4$ = width of vertically disposed tapes (see FIG. 28)
X = center-to-center distance between vertically disposed tapes as 206 (see FIGS. 25 and 28)
Y = center-to-center distance between horizontally disposed tapes as 202 of FIG. 25 (see FIG. 28)
$F_3$ = edge-to-edge distance between horizontally disposed tapes (see FIG. 28)
$F_4$ = width of individual horizontally disposed foraminous components
$F_5$ = edge-to-edge distance between vertically disposed tapes (see FIG. 28)
$F_6$ = width of individual vertically disposed foraminous components
$m_2$ = number of horizontally disposed foraminous components captured between edges of horizontally disposed tapes
$m_3$ = number of vertically disposed foraminous components captured between edges of vertically disposed tapes Relationships between the variables include:

$$X = (\pi d/2)/n_2$$

$$P_2 = P_3/P_1 = (X - W_4)(Y - W_3)/XY$$

$$n_1 = 1/Y$$

$$n_2 = F_3/F_5$$

$$m_3 = F_4/F_6$$

For the braided tubes of FIGS. 1–23, selection of the angle $\alpha$ (see FIG. 27) will have a bearing upon the strength of the thermoplastic latticework. For angles above 45°, strength in a longitudinal or axial direction will be enhanced more substantially than will strength in a radial direction, i.e. "burst resistance". Angles below 45° will enhance burst resistance as versus longitudinal or axial strength. As angle $\alpha$ is decreased below 45°, an increased radial pressure may be exerted upon active material contained within the tubular body. This may be explained by the fact that active material, as it expands, will tend to impress itself between the tapes, staple fibers, etc., thus exerting maximum friction against these components.

Since the angle $\alpha$ is small, restrictive force against radial expansion may be greater than restrictive forces against axial expansion, thus the majority of expansion may take place in the axial direction. Since friction between the active material and components of the braided tubular body may be relatively high, these components may tend to be carried with the active material as it expands in an axial direction, thus exerting forces which will tend to attempt to increase angle $\alpha$. As a result, the braided tubular body may tend to decrease slightly in diameter, providing an increased resistance against radial expansion.

For the above reasons it may be advantageous to specify $\alpha$ as being somewhat less than 45°.

The following is offered as a numerical example of the calculation method described above.

It is desired to produce a single-walled composite tubular body, similar to that illustrated in FIG. 1, having a diameter of ⅜" and a porosity comparable to an existing double-walled tube having a "perforation ratio", ($P_2$), i.e. a ratio between the perforations of an outer PVC wall and the total surface area of the tube, of 0.54 or 54%. For strength purposes, angle $\alpha$ is specified as 30°.

To provide a maximum amount of interbraiding between tapes and foraminous components, it is desired to provide an even integral number "m" of foraminous components between adjacent and parallel tapes. This number will be selected as 6.

The number of tapes "n" must be an integer; the number of foraminous components "m" between adjacent parallel tapes, plus one (representing the tape) must be integrally divisible into the number of clockwise (or counterclockwise) traveling spools on an available braiding machine. Machines available at this time have 56, 64 and 72 spools, (i.e. 28, 32 and 36 clockwise traveling spools respectively).

The only machine which meets the above stated criteria is the 56-spool machine, where $$56/2/(m+1) = 28/n = 4$$

Therefore the number of tapes "n" will be selected as 4, and $$W_1 = \sin\alpha \, (\pi d/n)(1 - \sqrt{P_2})$$

$$0.5 \frac{(3.1416)(.375)}{4} \times (1 - \sqrt{.54}) = 0.0390 \text{ inches}$$

Quantity $Z = 1/(\pi d/n \tan\alpha) =$ $$1/\frac{(3.1416)(.375)}{4}(.57735) = 5.881$$

which may be related to the rate of advance of the braided tubular body.

Dimension $X$ (see FIG. 27) $= \frac{(\pi d)}{n} - \frac{W_1}{\sin \alpha} = .2165$ inches Dimension $F_1$ (see FIG. 27) $= X \sin d = (.2165)(5) =$ 1082 inches $= .07192$ and width (or diameter) of the foraminous material, $F_2 = F_1/m = .07192/6 = .1082/6 = .0180$ It is determined that the above width $F_2$ (equal to the diameter of a single staple fiber yarn) is excessively small, therefore the number "m" may be reduced by 2; "m"=4.

Then $F_2 = 0.1082 = 0.0271$ inches which is acceptable; spools adjacent to tape-loaded spools on either side thereof will be left empty.

Figure 29:
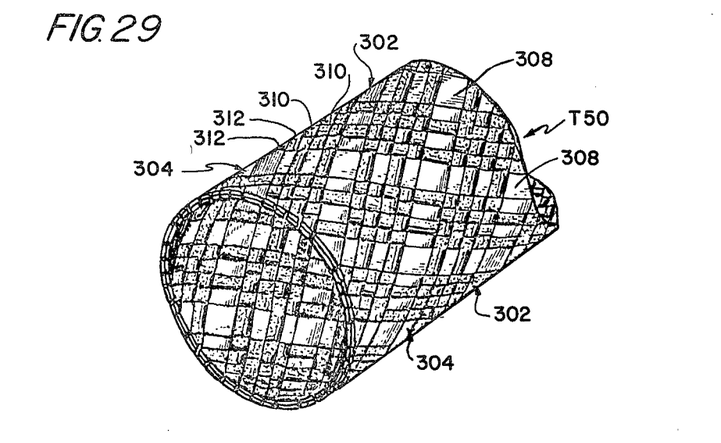
FIG. 29 is a view similar to that of FIG. 1 wherein the tapes include an unpolymerized material.

Considering next the second general type of reinforced tapes noted above under the heading (2), FIG. 29 illustrates a composite braided tubular body denoted by arrow T50. Included in body T50 are two sets of fabrication components. The first set consists of reinforced tapes generally denoted by arrows as 302, as shown in FIG. 29, and oppositely directed tapes generally denoted by arrows as 304. These tapes bear on their surfaces an unpolymerized material. Examples of an unpolymerized material which may be utilized are unpolymerized polyesters, unpolymerized phenolic resins and resins of the epoxy or furan classes. Tapes as 302 and 304 overlie one another at points of overlap indicated by numerals as 308.

A second set of fabrication components indicated by numerals as 310 and 312 are of a foraminous nature. The two sets of fabrication components are braided together to form the composite textured tubular body of FIG. 29 which may be of extended length. This extended length of tubular body may be collapsed and wound around a storage reel.

Figures 30, 31:
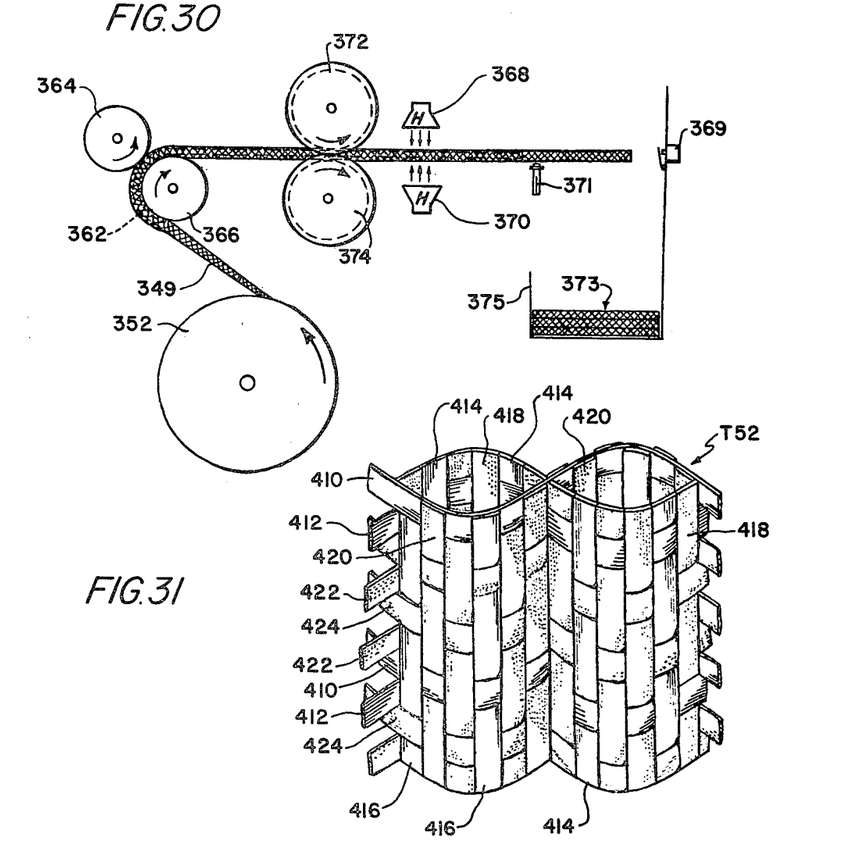
FIG. 30 is a view similar to that of FIG. 10, but illustrating externally applied means for carrying out polymerization of tapes bearing an unpolymerized material.
FIG. 31 is a view similar to FIG. 26 wherein the tapes including unpolymerized material are employed in a cartridge-belt type of multiple tube arrangement.

FIG. 30 illustrates a method of externally applying one form of polymerization means consisting of radiant heating means. As shown therein, collapsed tubing 349 is fed from a storage reel 352 onto a forming mandrel 362, drawn by drive wheels 364 and 366. The mandrel 362 may be of some desired cross-section, for example, circular, rectangular, etc.

As the collapsed tubular material becomes expanded in passing over the mandrel 362, shown in FIG. 30, it is contained between forming rollers 372 and 374 and is further advanced along a path which passes between radiant heating means 368 and 370 operative to apply heat to the unpolymerized material in sufficient degree to cause polymerization.

In accordance with the invention, as polymerization occurs, the tapes become fusion integrated with one another and the foraminous material becomes partially embedded in the surfaces of the tapes.

FIG. 31 illustrates a multiple tube arrangement, generally denoted by arrow T52 wherein a plurality of sets of tapes bearing an unpolymerized material are combined with a plurality of sets of strips of foraminous material in a commonly called cartridge-belt configuration. Four distinct sets of unpolymerized material bearing tapes denoted by numerals as 410, 412, 414, and 416 are used, as are four distinct sets of foraminous strips denoted by numerals as 418, 420, 422 and 424. Polymerization means may be externally applied in a manner similar to that described in FIG. 30, and alternate forms of polymerization means may include ultraviolet heating, chemical agencies and the like.

I claim:

1. A textured tubular body comprising a latticework of spaced apart tapes selected from the group consisting of a thermoplastic material, unpolymerized phenolic resins, unpolymerized polyesters, unpolymerized epoxy resins, and unpolymerized furan resins, said tapes having reinforcing means included internally therein, the said tapes being interwoven to define interrupted rows of spaces, a foraminous material selected from the group consisting of glass fiber, polyester and mixtures thereof and comprising means for retaining active material and arranged to fill the spaces in the said rows, said reinforced tapes characterized by the ability to undergo integration with one another in response to externally applied means.

2. A textured tubular body comprising a mixture of fabrication components, said mixture of components including a latticework of spaced apart tapes selected from the group consisting of a thermoplastic material, unpolymerized phenolic resins, unpolymerized polyesters, unpolymerized epoxy resins, and unpolymerized furan resins having reinforcing means included therein, said tapes being integrated with one another at their points of overlap and being interwoven to define interrupted rows of spaces, a network of fibers of foraminous material selected from the group consisting of glass fiber, polyester and mixtures thereof interwoven with the latticework between edges of the tapes to fill the rows of spaces along paths of sinuosity which occur in angularly disposed relation to one another, said network of fibers of foraminous material defining openings in which adjacent tape portions which overlap one another are confined to maintain the tape components and the network components in relatively fixed relationship to one another throughout the textured tubular body.

3. The invention of claim 2 in which the spacing of the tapes and the network of fibers therein are selected to provide a predetermined porosity in the tubular body.

4. The invention of claim 2 in which the tubular body occurs as a collapsed tubular material.

5. The invention of claim 2 in which the paths of sinuosity of the network of fibers extend above and below the tapes in an alternating manner.

6. A textured tubular body comprising a mixture of fabrication components, said mixture of fabrication components including a seamless helical latticework of spaced apart tapes of a thermoplastic material having reinforcing means included therein, said tapes being fused to one another and interbraided to define interrupted rows of spaces, a network of fibers of foraminous material selected from the group consisting of glass fibers, polyester and mixtures thereof and braided into the latticework between edges of the tapes to fill the rows of spaces along paths of sinuosity which occur in angularly disposed relation to one another, said network of fibers of foraminous material defining openings in which adjacent tape portions which overlap one another are confined to maintain the tape components and the network components in relatively fixed relationship to one another throughout the tubular body.

7. The invention of claim 6 in which the thermoplastic material of the tapes is responsive to heat and pressure to fusion integrate the said tapes which overlap one another and receive portions of the said network of fibers in embedded relationship with tape portions which do not overlap one another.

8. The invention of claim 6 in which the reinforcing means of the thermoplastic tapes are arranged to limit the extent of the embedding of the network of fibers in the tape surfaces.

9. A textured tubular body comprising a latticework of spaced tapes selected from the group consisting of a thermoplastic material, unpolymerized phenolic resins, unpolymerized polyesters, unpolymerized epoxy resins, and unpolymerized furan resins, said tapes having reinforcing means included internally therein, the said tapes being woven to define interrupted rows of spaces, and a foraminous material selected from the group consisting of glass fiber, polyester and mixtures thereof and comprising means for retaining active material arranged to fill the spaces of the said rows, said reinforced tapes characterized by the ability to undergo changes in state in response to externally applied means.

10. A tubular body for use in a tubular storage battery plate comprising a plurality of tapes selected from the group consisting of a thermoplastic material, unpolymerized phenolic resins, unpolymerized polyesters, unpolymerized epoxy resins, and unpolymerized furan resins, said tapes having reinforcing means included internally therein, the said tapes being interwoven in a predetermined spaced relationship to define interrupted rows of spaces and control the porosity of the tubular body, a foraminous material selected from the group consisting of glass fiber, polyester or mixtures thereof and comprising a retaining means for confining active material, said foraminous material being arranged to substantially close the said spaces in the interrupted rows, and said reinforced tapes characterized by the ability to undergo changes in state in response to externally applied means.

11. The invention of claim 10 in which the said reinforced tapes consist of an unpolymerized material characterized by the ability to undergo polymerization in response to externally applied means.

12. A porous tubular body including a set of reinforced thermoplastic tapes arranged in spaced apart relation along oppositely directed helical paths to form a seamless tubular latticework, said tapes comprising strips having reinforcing means internally included therein, overlapping tape portions in the latticework being integrated with one another, a network of fibers of a foraminous material selected from the group consisting of glass fiber, polyester or mixtures thereof and interbraided with the tapes to produce an interlocking textured tubular body, said network extending along paths of sinuosity which are angularly disposed to one another and being embedded in surfaces of the tapes to a limited extent determined by the reinforcing means.

13. The invention of claim 12 in which the reinforcing means consists of filaments of reinforcing material located internally in the tapes and the extent of embedding is limited by the reinforcing means.

14. In a multi-tubular body for use in lead-acid storage battery plates the improvement which comprises a first array of fusible flat reinforced tapes selected from the group consisting of a thermoplastic material, unpolymerized phenolic resins, unpolymerized polyesters, unpolymerized epoxy resins, and unpolymerized furan resins oriented parallel to the central axis of the tubes and a second array of tapes oriented at right angles to the first array, the first and second arrays being woven together with corresponding arrays of foraminous material selected from the group consisting of glass fiber, polyester or mixtures thereof and formed on a cartridge-belt loom to provide a series of interconnected individual tubes, the tapes being integrated with one another at their points of overlap to define opposing interwoven lattice structures presenting quadrilateral openings having said foraminous material captured therein, the porosity of the tubes being predetermined and controlled by the width of the tapes, their arrangement in the weave and the foraminous material.

* * * * *